INVENTOR
HENRY SCHMIDT, JR.

BY
Mason Kolehmainen, Rathburn and Wyss.
ATTORNEYS.

Dec. 21, 1965 H. SCHMIDT, JR 3,224,587
FILTRATION APPARATUS UTILIZING UNROLLABLE FILTER MEDIUM
Filed Dec. 4, 1957 4 Sheets-Sheet 3

INVENTOR
HENRY SCHMIDT, JR.

by Mason, Kolehmainen, Rathburn and Wyss
ATTORNEYS.

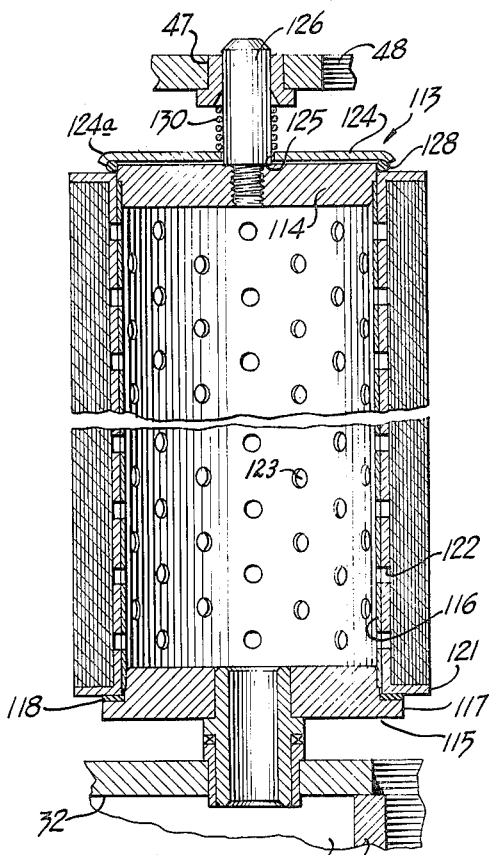
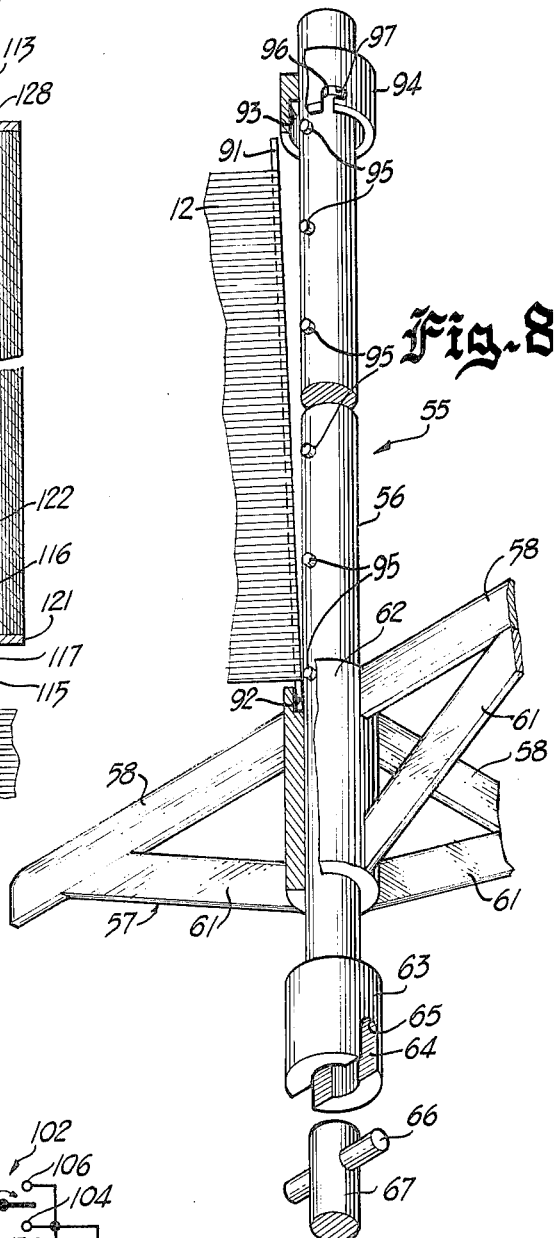
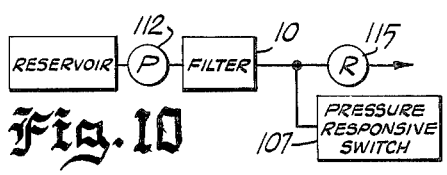
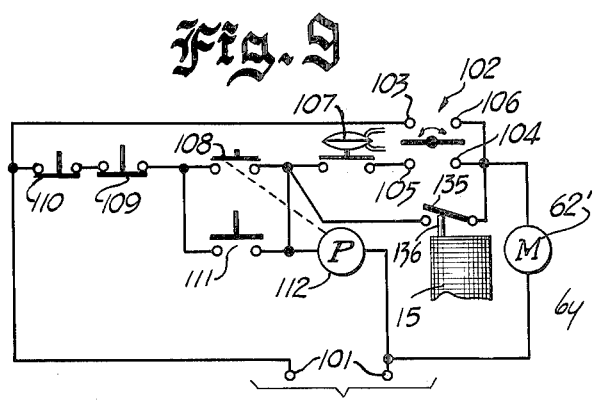

United States Patent Office 3,224,587
Patented Dec. 21, 1965

3,224,587
FILTRATION APPARATUS UTILIZING UNROLL-ABLE FILTER MEDIUM
Henry Schmidt, Jr., Hinsdale, Ill., assignor to Industrial Filter & Pump Mfg. Co., Chicago, Ill., a corporation of Illinois
Filed Dec. 4, 1957, Ser. No. 700,652
10 Claims. (Cl. 210—330)

The present invention relates to filtration apparatus and more particularly to a new and improved filter unit employing a fabric or paper filter medium for removing undesirable particles from a liquid.

Although filtering units employing a fabric or paper filtering medium have been in use for a great many years, such filters have for the most part been used in applications where only a relatively small filtering area need be employed. The use of fabric or paper filtering material has, however, many advantages for certain applications over the use of other known types of filtering material and, therefore, it would be desirable to provide high capacity filtering units which employ fabric or paper as the filtering media.

Therefore, a principal object of the present invention is to provide new and improved filtration apparatus for clarifying liquids.

Another object of the present invention is to provide a new and improved method of filtration;

A further object of the present invention is to provide a new and improved filtration apparatus having a relatively large filtration surface area relative to the overall size of the filtering unit.

Another object of the present invention is to provide a new and improved filter including means for automatically cleaning the effective filtering medium when it becomes plugged or when an undesirably thick cake is deposited thereon.

Still another object of the present invention is to provide a new and improved filtering unit which operates automatically to maintain a relatively constant pressure drop thereacross and in which the cleaning time and thus the shut-down time of the filter is maintained at a minimum.

The invention, both as to its organization and method of operation, together with further objects and advantages thereof, will best be understood by reference to the following specification, taken in connection with the accompanying drawings, in which:

FIG. 3 is a cross sectional view taken along the line 3—3 of FIG. 2, assuming the entire filter to be shown therein;

FIG. 7 is a sectional view of a cartridge type magazine which may be employed in the filter unit shown in FIG. 2 to facilitate the changing of the filter roll;

FIG. 8 is a fragmentary pictorial view of the central spindle of the device of FIG. 2;

FIG. 9 is a schematic circuit diagram of a control circuit which may be used for controlling the automatic operation of the multiple roll filter of the present invention; and FIG. 10 is a schematic diagram of the flow circuit for the filter 10.

Figure 1:
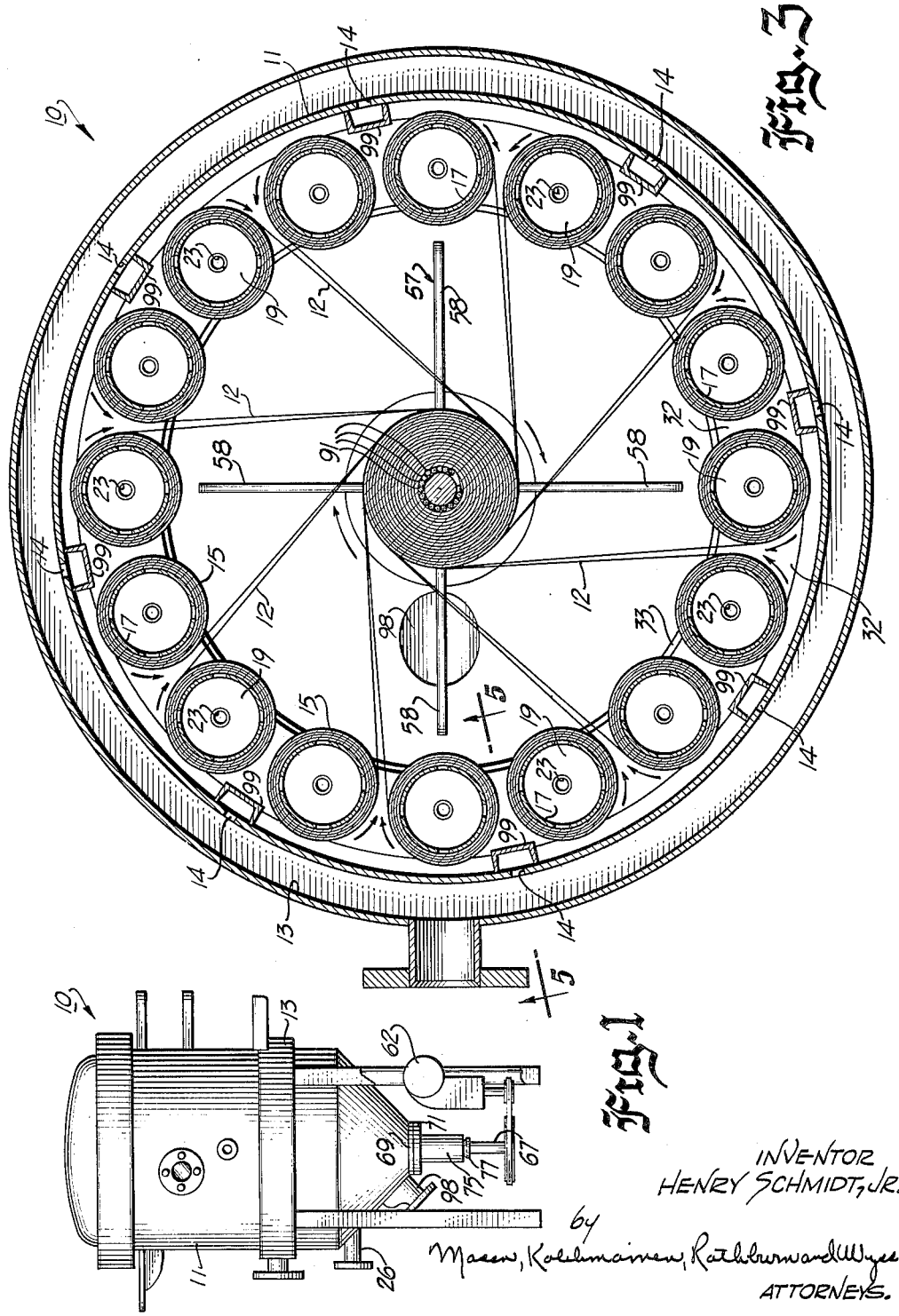
FIG. 1 is a side elevational view, partly schematic, of a filtering unit embodying the present invention.

Referring now to the drawings, and particularly to FIGS. 1–4, there is shown a filter unit 10 which comprises a generally cylindrical tank 11 enclosing a filter chamber in which is disposed a plurality of sheets of a filter material 12. An inlet manifold 13 into which a liquid to be clarified is pumped, surrounds the tank 11 and communicates with the filter chamber through a plurality of apertures 14 spatially arranged about the periphery of the tank 11. The filter material 12, which is preferably an unwoven fabric or a high grade filter paper, such as parchment, is in the form of a plurality of sheets respectively wound in a plurality of filter rolls 15 rotatably mounted about the periphery of the filter chamber at equal distances from the principal longitudinal axis of the filter 10.

Figure 2:
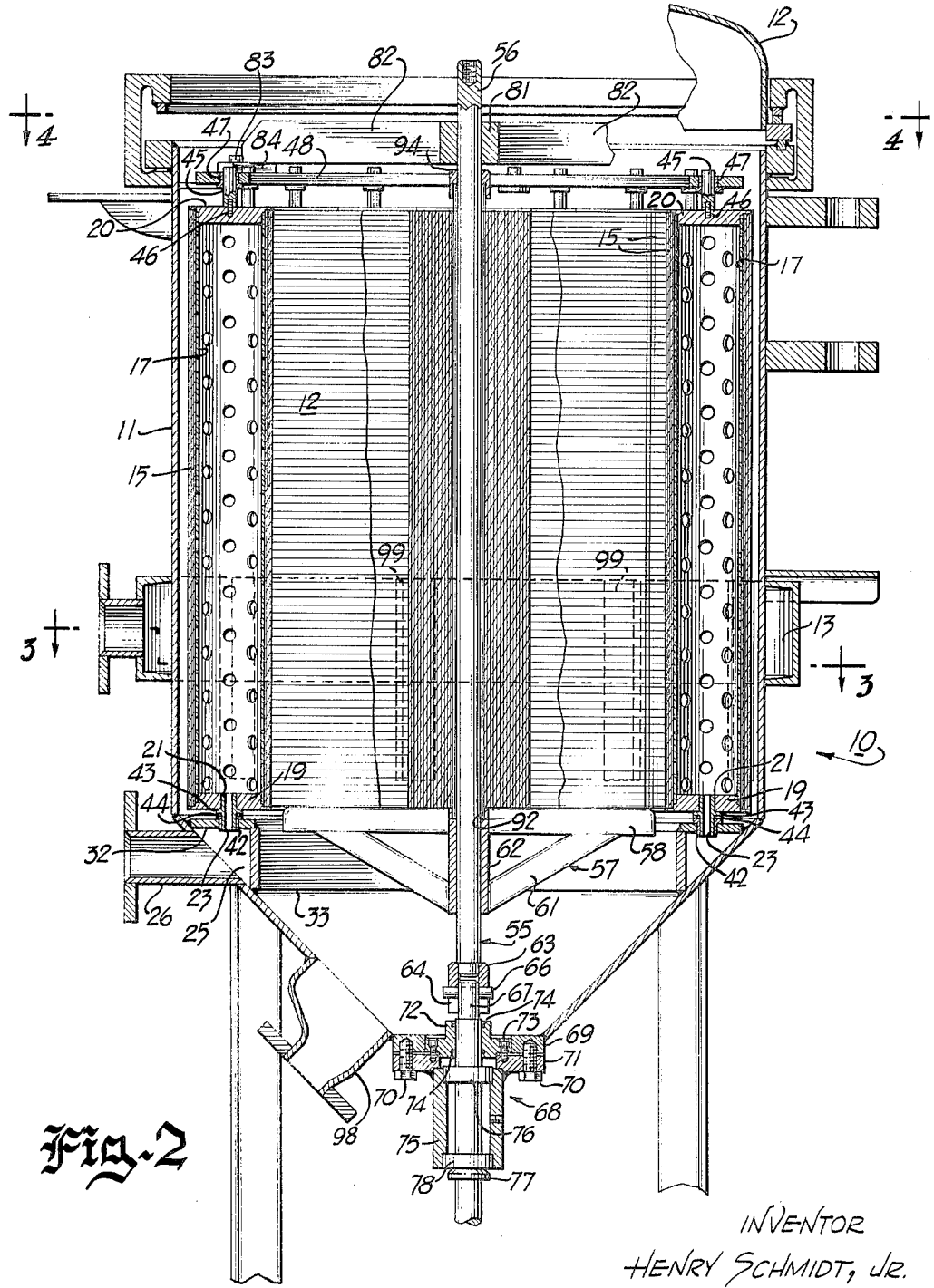
FIG. 2 is a cross sectional elevational view of a multiple roll filter unit embodying the present invention.

As best shown in FIG. 2, the filter rolls 15 each comprise a relatively large number of turns of a sheet of filter material 12 wound on a tube 17 which is perforated throughout its length, and a pair of end caps 19 and 20 are respectively provided with portions of reduced size which tightly fit into the ends of the tube 17. The cap 20, which is positioned at the top of the tube 17, is imperforate and the cap 19, which is positioned at the bottom of the tube 17, has a central hole 21 in which a tubular connector 23 is press-fitted. An annular outlet manifold 25 is disposed adjacent the inner wall of the tank 11 beneath the filter rolls 15 and opens into an outlet duct 26. As best shown in FIG. 2, the exhaust manifold 25 is formed by a pair of annular plates 32 and 33 which are welded together and to the tank 11 to provide an annular passageway beneath the plate 32.

The upper plate 32, which is mounted in a horizontal plane, is provided with a plurality of holes into which the connectors 23 depend. The exhaust manifold 25 thus communicates with the filter chamber only through the filter rolls 15. A plurality of sleeve bearings 42 are respectively mounted in the plate 32 and the connectors 23 are each provided with external flanges 43 which rest on respective ones of a plurality of annular gaskets 44 disposed between the flanges 43 and the sleeve bearings 42. Each of the rolls 15 includes an upstanding stud 45 which is attached by a threaded connector 46 to the center of the cap 20, and the studs 45 loosely extend through sleeve bushings 47 in an annular mounting plate 48 supported on a plurality of lugs 51 (FIG. 4) near the top of the tank 11. Since the interiors of the rolls 15 and the exhaust manifold 25 are sealed from the filter chamber, the liquid which is forced, under pressure, into the inlet manifold 13 flows through the sheets of filter material 12, into the tubes 17 and thus into the exhaust manifold 25.

In passing through the plurality of turns of filter material 12 on each roll, those particles which are suspended in the liquid and which have a size exceeding that of the pores in the filter material 12 are deposited on or in the outside turns of the filter material 12 on the rolls 15, and where a good grade of filter material 12 is used, little, if any, filtering is effected by the inner turns of the filter rolls 15, the only action of the inner turns being to cause an increase in the pressure drop through the rolls 15.

Since the filter 10 is designed for use in a pressurized rather than a vacuum type system, this increase in the pressure drop through the filter 10 is of little consequence.

After the filter 10 has been in use for a considerable period of time, the outside turns of the filter material ordinarily become plugged so that the energy which must be expended to force the liquid through the filter material becomes so great as to reduce the efficiency of operation of the filter 10 below an economical level. At this time, and in accordance with the present invention, a common take-up spool 55, which is centrally disposed in the filter chamber and to which the outside turns of the filter material 12 on each of the rolls 15 is connected, is rotated to unwind the plugged portions of the filter material 12 from the rolls 15. The plugged filter material is thus removed from the path of fluid flow through the filter 10 and the efficiency of operation returns to the normal level until the newly exposed turns of filter material again become plugged. The above described cycle of operation is repeated until the unexposed filter material on the rolls 15 has been exhausted. At this time the filter 10 is disconnected from the line, the cover is removed and the used filter material is replaced with a fresh supply. The cover is thereafter moved into place and the filter may again be returned to the line.

As best shown in FIGS. 2, 3, 4 and 8, the take-up spool 55 comprises a spindle 56 on which the used portions of the sheets of filter material 12 are wound. The used filter material 12 is relatively heavy inasmuch as it is soaked with the liquid being filtered, and, therefore, the spool 55 includes a lower spider 57 including a plurality of braces for supporting the used filter material when the spool 55 is removed from the tank 11. The spider 57 suitably comprises a plurality of arms 58 having the end portions chamfered to avoid any interference with the passage of the used filter material onto the spindle 56 and a plurality of braces 61. A sleeve 62 is welded to the spindle 56 and the arms 58 and braces 61 are welded to the sleeve 62. A collar 63 is welded to the spindle 56 at the lower end thereof to fixedly position the take-up spool 55 in alignment with the filter rolls 15 and to drivingly connect the spool 55 to a drive motor 62', best shown in FIG. 1. As shown in FIG. 8, the lower end of the collar 63 is provided with a diametrically disposed slot 64 having an arcuate upper surface 65 which receives the end portions of a pin 66 mounted in a suitable hole in the upper end of a vertically disposed drive shaft 67.

As best shown in FIG. 2, the drive shaft 67 extends through a bearing and sealing unit 68 at the bottom of the tank 11. A ring 69 which is welded to the adjoining surfaces of the tank 11 at the bottom thereof is connected by means of a plurality of screws 70 to an annular flange 71 having an internal diameter which is less than that of the ring 69. A seal box 72 is mounted in the recess in the ring 69 and rests on the shoulder provided by the flange 71. The box 72 is secured in place by means of a plurality of bolts 73 which extend through suitable holes in the seal box 72 and are threadedly received in tapped holes in the flange 71. The portion of the drive shaft 67 which extends through the seal box 72 preferably has a polished finish thereby to insure a good seal between the shaft 67 and a plurality of resilient O-rings 74 which are mounted in suitable annular recesses in the bore of the seal box 72.

The shaft 67 and thus the take-up spool 55 which is mounted thereon is rotatably supported by means of a sleeve 75 which is welded to the flange 71. A thrust bearing 76 is interposed between the shaft 67 and the sleeve 75 with the outer race of the bearing 76 being seated in a counterbore at the top of the sleeve 75. In order to retain the drive shaft 67 in place when the take-up spool 55 is withdrawn from the tank 11, a beveled collar 77 is secured to the shaft 67 and a thrust bearing 78 is interposed between the sleeve 75 and the collar 77. The thrust bearing assemblies 76 and 78 thus rotatably mount the drive shaft 67 in the tank 11 and also prevent any relative axial movement between the drive shaft 67 and the tank 11.

Figure 4:
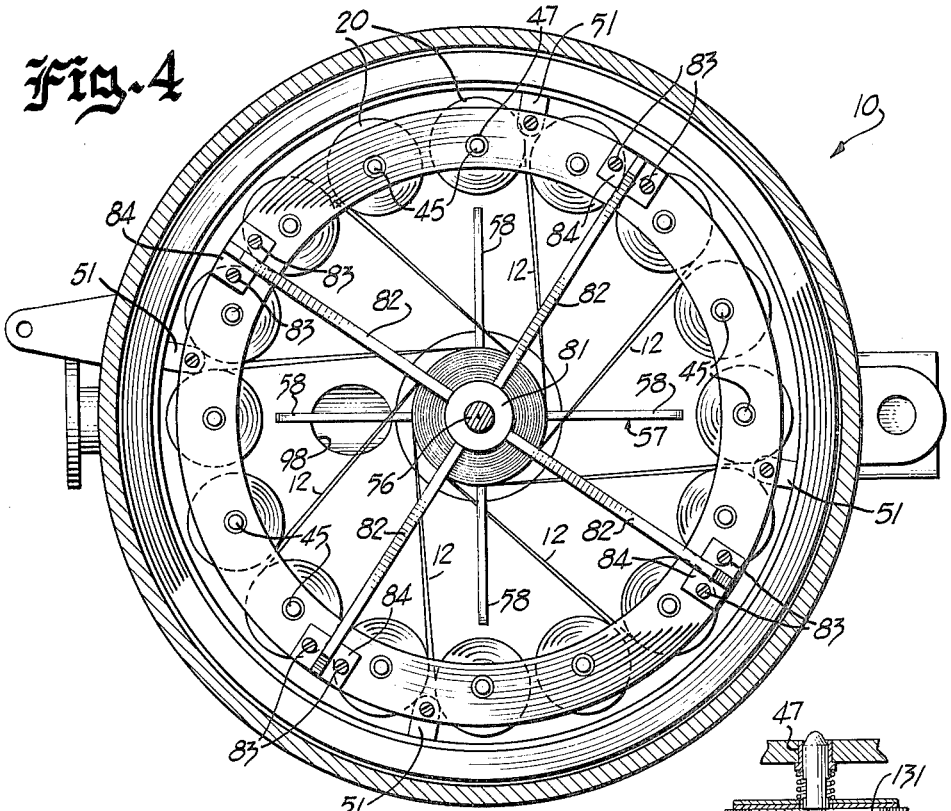
FIG. 4 is a cross sectional view taken along the line 4—4 of FIG. 2, assuming the entire structure to be shown therein.

In order to maintain the take-up spool 55 in a vertical position within the chamber 11, the upper end of the spindle 56 extends through a sleeve bearing 81 which is supported on the principal longitudinal axis of the filter chamber on a plurality of spider arms 82 which, as best shown in FIG. 4, are secured at their outer ends to the annular plate 48 by means of a plurality of screws 83. The screws 83 extend through suitable holes in brackets 84 which are welded to the spider arms 82, the screws 83 being threadedly received in tapped holes in the plates 48.

It may thus be seen that the filter 10 comprises a plurality of filter rolls 15 which are rotatably mounted about the periphery of the filter chamber near the wall of the tank 11 and which are individually connected through the filter material itself to a common take-up spool 55 journaled at the center of the chamber. Accordingly, whenever the spool 55 is rotated, the exposed portion of the sheets of filter material 12 on each of the filter rolls 15 is changed.

A few turns of the filter material 12 are fixed to each of the tubes 17 and the remainder of the turns are wound over these few turns but are not attached thereto so that when all of the material 12 has been used, it pulls free of the tube. However, the few turns which are affixed to the tube 17 remain in place to prevent unfiltered liquid from passing into the exhaust manifold 26. When these few turns become plugged, the pressure in the filter chamber increases above a predetermined value to cause a pressure safety switch (not shown) to shut down the filter. It thus becomes necessary to replace the used filter material with new material. In order to do this the filter 10 is temporarily disconnected from the line by closing suitable valves, not shown, in the input and output lines to and from the inlet and outlet of the filter and the cover is removed from the tank 11. The plate 48 with the spider 82 attached is then lifted off the lugs 51 and removed from the tank. An eye-bolt, not shown, is secured to the internally threaded upper end of the spindle 56. A suitable hoist is attached to the eyebolt and the spool 55 may then be lifted out of the tank 11. The used filter material 12 may then be removed from the spindle 56 by inverting the spindle or by any other suitable means.

In order to place new filter material 12 in the tank, the rolls 15 are removed from the tank, rewound, and returned thereto. Thereafter, the spool 55 is returned to the filter chamber and placed over the upper end of the shaft 67 with the pin 66 being received in the upper end of the slot 64. The plate 48 is then returned to place and secured by suitable screws to the lugs 51 on which it is supported. The outer turn of filter material on the filter rolls 15 may then be unwound and attached to the spool 55 in a manner best understood by reference to FIG. 8. The ends of the filter sheets 12 are provided with respective loops into which a plurality of rods 91 are threaded. The rods 91 are somewhat longer than the width of the sheets 12 so as to extend a few inches beyond the sheets at both the tops and bottoms thereof. The lower ends of the rods 91 may thus be placed in a counterbore 92 at the top of the sleeve 62 and the upper portions of the rods 91 may be disposed in the downwardly facing counter bore 93 of a collar 94. A plurality of pins 95 extend from the spindle 56 so as to effectively engage the rods 91 when the spindle 56 is rotated thereby to unwind the filter sheets 12 from the respective rolls 15.

In order to facilitate the insertion of the rods 91 into the collar 94, a slot 96 is provided in the lower wall of the collar 94. Consequently, in attaching the rods 91 to the spindle 56, the collar 94 may be positioned on the spindle 56 so that the bottom thereof is below the tops of the pins 91 and the top of the slot 96 above the tops of the pins 91. Accordingly, the pins may be moved into the counterbore 93 through the slot 96, the collar 94 providing a convenient means for holding the pins 91 as they are slipped one by one into the counterbore 93.

As shown, the slot 96 is provided with an offset portion 97 at the top thereof for receiving the uppermost one of the pins 95 to lock the collar in place after all of the pins have been placed therein.

At the time that the filter material 12 is replaced, a drain connection 98 which connects to the bottom of the tank 11 may be opened to drain out any sediment which may have been collected in the dead bottom of the filter chamber.

Figure 5:
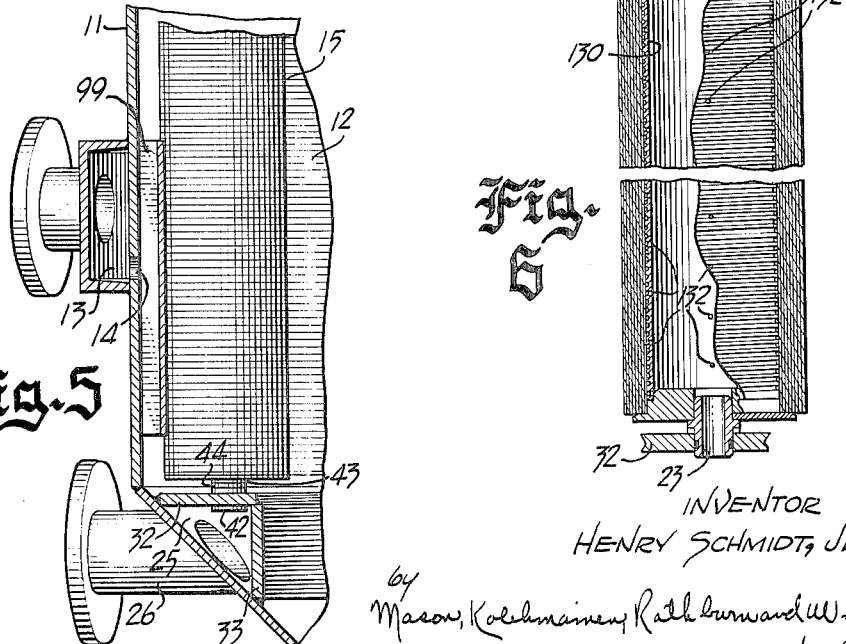
FIG. 5 is a fragmentary cross sectional view taken along the line 5—5 of FIG. 3, assuming the entire filter to be shown therein.

In the event that a filtering process is employed wherein a filter cake is built up on a filter material, in order to minimize the removal of this cake during rotation of the rolls 15 to expose a new filter area to the liquid to be clarified, preferably the adjacent rolls 15 are oppositely wound so that, as best shown in FIG. 3, the adjacent ones of the rolls 15 are rotated in opposite directions when the take-up spool 55 is rotated. As shown in FIG. 3, the inlet apertures 14 in the inlet manifold 13 are spaced apart by two of the rolls 15 and are so disposed as to be positioned between adjacent rolls 15 on which the used filter sheets are rotated away from the associated aperture 14. It may thus be seen as the rolls 15 are rotated as a result of the rotation of the wind-up spool 55 the exposed portions of each of the surfaces on the filter material 12 are compressed against the similarly used surface of the adjacent filter roll and that the fluid which is supplied to the filter flows principally in the area of the unused filter material. In this manner a minimun amount of any filter cake which may have been deposited on the filter material is removed and thus returned to the liquid being clarified. Moreover, there is associated with each of the apertures 14 a channel-like baffle member 99 which, as best shown in FIG. 5, extends in a vertical direction and directs the liquid in an axial direction to prevent direct impingement of the incoming liquid on the filter material 12. Moreover, the liquid which is directed downward by the baffles 99 keeps the upper surface of the outlet manifold clean by causing a continuous flow of liquid across the upper surface of the plate 32.

Referring now to FIG. 9, there is shown a schematic circuit diagram of an electric control system for operating the motor 62′ so as to automatically change the filter material whenever the exposed portion thereof becomes sufficiently clogged to prevent the efficient operation of the filter 10.

This control system is adapted to be energized from across a suitable power line connected to a pair of terminals 101. Accordingly, the motor 62′ is adapted to be connected across the power lines 101 through a rotary type three-position switch 102 which has a set of terminals 103 and 104 and another set of terminals 105 and 106. The switch 102 may be positioned so as to interconnect the terminals 103 and 104 thereby to energize the motor 62′. This is the manual position of the switch and whenever it is so positioned the take-up spindle 55 is rotated and continues to rotate until the switch 102 is moved to the off position as shown in FIG 9. When, however, it is desired to automatically control the system, the switch 102 is operated so as to connect the terminals 105 and 106, whereby the motor 62′ is connected across the terminals 101 through the series connection of a normally open set of contacts 107, another set of normally open contacts 108, a normally closed stop switch 109 and another set of normally closed contacts 110. The stop switch 109 thus enables rapid stopping of the motor 62′ in the event that it becomes necessary.

A start switch 111 is connected directly across the normally open contacts 108 and a pump 112 which may be connected in the inlet line to the inlet manifold 13 for pumping the fluid through the filter is connected in parallel with the motor 62′ and the contacts 107.

The contacts 107 are part of a pressure operated differential type switch which causes the contacts 107 to be closed when the pressure in the outlet manifold 25 falls below a predetermined level. The contacts 107 remain closed until the pressure in the manifold 25 increases above another predetermined level which is greater, by a predetermined amount, than the lower predetermined pressure at which the switch contacts 107 are closed.

Considering the operation of the system, with the cover 12 of the filter 10 sealed to the tank 11, the start switch 111 may be closed thereby to energize the pump 112 by virtue of the fact that the stop switch 109 is closed and the normally closed contacts 110 of the pressure safety switch are also closed, since the pressure in the tank at this time is not excessive. The pump is thus energized to pump the fluid through the tank for clarification. This continues until the filter material becomes sufficiently clogged that the pressure in the outlet manifold begins to drop. When this happens the contacts 107 close and since the contacts 108, which are associated with the pump 112 and are closed as long as the pump 112 is energized, were previously closed, the motor 62′ is energized thereby to rotate the take-up spool 55 to remove the clogged filter material from the rolls 15. As the used filter material is moved out of the flow path, the pressure in the outlet manifold continues to rise until it reaches the value at which the pressure switch 107 is again operated and the switch contacts 107 open. When the contacts 107 open, the motor 62′ is deenergized but the pump 112, of course, continues to operate to pump fluid through the filter.

Referring to FIG. 10, there is shown in schematic form the flow circuit for the filter 10. In accordance with this invention, the pump 112 is a constant pressure output type, such, for example, as a centrifugal pump which provides a constant head at a given flow rate. A suitable flow regulator 115 is connected in the outlet line of the filter 10 to maintain the flow through the filter 10 at a constant rate. Accordingly, the pressure in the outlet line is directly related to the resistance offered by the filter to the flow of fluid therethrough, and a decrease in the outlet pressure is indicative of the fact that the filter material is becoming clogged.

Referring to FIG. 7, wherein there is shown an alternative type of take-up spool in which cartridges 113 of filter material may be readily replaced instead of rewound as is the case with the filter rolls 15. The cartridge 113 comprises a set of upper and lower disks 114 and 115 having portions of reduced cross section inserted into the ends of a perforated tubular support member 116. The lower disk 115 has an outwardly directed annular flange 117 around the upper surface of which is disposed an annular gasket 118, and a flanged sleeve 121 on which the filter material is previously wound is disposed over the tube 116 and rests on the gasket 118 to provide a seal between the sleeve 121 and the disk 115 thereby to prevent fluid from bypassing the filter material as it passes from the filter chamber into the tube 116. As shown, the sleeve 121 is provided with a plurality of apertures 122 which are so disposed in the sleeve 121 that a large number of them are necessarily aligned with the apertures 123 in the tube 116.

In order to press the cartridge 113 against the gasket 118 and at the same time permit a facile removal of the cartridge 113 in order to replace it, a disk-shaped cap 124 is positioned over the top of the disk 114 and is provided with a centarl aperture 125 through which a suitable stud 126, which is threadedly connected to the disk 114, extends. The stud 126 is received in the bushing 47 in the support plate 48 at the top of the filter. A resilient annular sealing ring 128 is positioned between the cap 124 and the top of the sleeve 121 and if desired the ends 124a of the cap 124 may be down-turned so as to hold the ring 128 in place in engagement with the disk 114 and the sleeve 121 thereby providing the necessary seal to prevent the fluid in the filter chamber from bypassing the filter material as it flows into the tube 116. A coil spring 130 surrounds the stud 126 and is compressed between the lower surface of the bushings 47 and the top of the disk 124 so that when the ring 48 is put into place after the new magazines have been positioned over the tube 116, the springs 130 are compressed to force the cap 124 against the sealing ring 128 thereby to insure a good seal between the sleeve 121 and the upper disk 114 as well as between the sleeve 121 and the lower disk 115.

In order to replace the filter material in a filter unit employing cartridge type replacement filters 113, the ring 48 is removed from the filter unit in the manner described hereinbefore, the springs 130 are lifted off the studs 126 and the caps 124 are then removed from the unit. The sleeves 121 may then be slipped off the respective tubes 116 and over the upper disks 114 and replaced with new sleeves which are prewound with the new filter material. Thereafter, the sealing ring 128 and the cap 124 are moved into place, the spring 130 is dropped over the stud 126 and the ring 48 is once more secured to the lugs 51. It may thus be seen that when using the cartridge type replacement unit 113 the filter material in a filter may be replaced in a very short period of time, thus minimizing the time that the filter must be disconnected from the line. Moreover, the replacement cartridges, being wound by the manufacturer, are all alike, the variation in the degree of tightness from roll to roll being negligible, thereby to insure that all of the filter rolls take an equal share of the load. This, of course, insures a maximum degree of efficiency in the operation of the filter.

Figure 6:
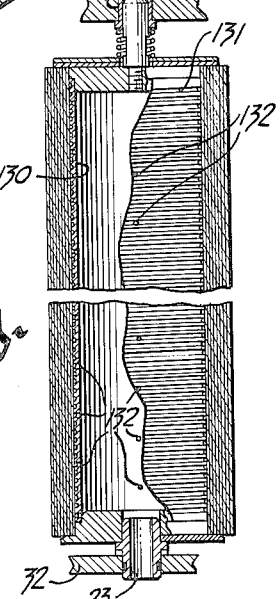
FIG. 6 is a fragmentary view of an alternative filter roll supporting structure.

In the embodiment of the invention illustrated in FIG. 2, the perforated tube 17 on which the filter material is rolled is simply a tube having a plurality of holes spatially arranged therein. Similarly, a perforated tube 116 is employed in the replaceable cartridge type of unit illustrated in FIG. 7. Ordinarily, these perforated tubes 17 or 116 are about three feet in length and it is very important particularly with the embodiment of the invention illustrated in FIG. 2 that these tubes be straight so as to permit even winding of the filter material thereon. Manufacturing of a tube of this type which is provided with a sufficient number of holes to insure use of the entire surface area of the filter material while maintaining such tube relatively straight is very difficult and expensive. In FIG. 6 there is shown a perforated tube which may be used in place of the tube 17 or 116 and which in contradistinction to the type tube shown in FIGS. 2 and 7 may be readily manufactured at a relatively low cost. As shown in FIG. 6, a tube 130 is provided with a helical groove 131 in the external wall thereof, which groove extends from the top to the bottom of the tube. A relatively few holes 132 are provided in the groove 131 at spatially arranged locations. In this manner but a few perforations need be provided and, therefore, a straight tube can be manufactured very simply and thus inexpensively. Because, however, of the helical groove in the tube, the liquid may flow through the filter to all areas of the tube even though the outlets therefrom are only relatively few in number. In manufacturing the tube 130, a straight tube is drawn in the usual manner and the groove 131 is thereafter machined in it. Following this operation, the holes 132 are drilled in place to complete the tube. The manner in which the tube is supported in the filter may be the same as that illustrated in FIGS. 2 and 7 and, therefore, is not described in detail in connection with FIG. 6. If desired, the tube may be initially drawn with longitudinal flutes therein and a few annular grooves may thereafter be machined in the surface of the tube to interconnect the flutes. Of course, holes must also be drilled in the tube to permit the flow of fluid therethrough.

In order to improve the efficiency of operation of a multiple filter unit, a normally closed switch 135 may be connected, as shown in FIG. 9, between the upper terminal of the motor 62' and the junction of the contacts 107 and 108. One of the rolls 15 is provided with a switch actuating arm 136 which opens the switch 135 at a predetermined angular position of the roll 15. Accordingly, whenever the switch contacts 107 close, or the switch 102 is rotated to the manual position to energize the motor 62', an auxiliary energization circuit for the motor is completed through the switch 135 which maintains the motor 62' energized until a complete revolution of the rolls 15 has occurred. Without the switch 135, less than a full three hundred sixty degrees of rotation of the rolls 15 ordinarily occurs since the pressure drop across the filter decreases to that value which causes contacts 107 to open when less than an entire new filter surface has been exposed. Also, the incorporation of the switch 135 in the control system enables the exposing of an entirely new filter surface by means of but a momentary actuation of the switch 102 to the manual position.

While particular embodiments of the invention have been shown, it will be understood, of course, that it is not desired that the invention be limited thereto since modifications may be made, and it is, therefore, contemplated by the appended claims to cover any such modifications as fall within the true spirit and scope of the invention.

Having thus described the invention, what is claimed as new and desired to be secured by Letters Patent is:

1. In a filter assembly, a plurality or rolls of filter material rotatably mounted in a filter chamber, a take-up spool, a plurality of rods connecting the outside turns of each of said rolls to said take-up spool, said rods being in substantially parallel relation with the axes of rotation of said rolls, and locking means for locking said rods to said take-up spool, including a first member mounted on said take-up spool, said first member and spool defining therebetween a bottomed channel having having an opening for receiving each of the rods near one end thereof, a second member slidably carried by the take-up spool and defining with the spool a space therebetween for receiving the opposite ends of each of said rods, said second member being slidable from a first position out of contact with the rods to a second position for receiving the said opposite ends of the rods, said second member having a slot therein for insertion of the said opposite ends of each of the rods into said space in sequential order after the other ends of each of the rods are inserted into the channel defined by the spool and the first member, and a device for releasably locking said second member in a fixed position after said rods have been received in said channels and said space thereby to secure said rods to said spool.

2. The combination set forth in claim 1 wherein said second member is a collar surrounding the spindle of said spool.

3. The combination set forth in claim 2 wherein said collar is provided with said slot in the wall adjacent said space, and said slot has a width at least as great as the external diameter of each of said rods whereby the upper portions of said rods may be moved through said slot into said counterbore.

4. The combination set forth in claim 1 wherein at least one protrusion is provided on a spindle portion of said spool for effectively engaging at least one of said rods intermediate the ends thereof when the spool is rotated thereby to unwind filter material from said rolls.

5. Filtration apparatus comprising a chamber having an inlet and an outlet, a plurality of filtration units mounted in said chamber between said inlet and said outlet, each of said units including a plurality of contiguous layers of a filter material wound on a perforate hollow support, said units being rotatably mounted around the periphery of said tank, adjacent ones of said units being oppositely wound, selectively operated means for simultaneously removing successive layers of filter material from all of said filtration units including a take-up spool centrally disposed with respect to said units, the outer turns of the sheets of filtering material in each of said filtration units being connected to said take-up spool so that filter cake on facing surfaces of adjacent oppositely wound rolls is trapped between the turns of filter material traveling between the rolls and take-up spool, and drive means for selectively rotating said take-up spool, whereby operation of said drive means rotates said take-up spool to simultaneously remove the outside turn of filter material from each of said filtration units.

6. Apparatus adapted to filter fluid medium comprising, a pressurizable chamber having an inlet for supply of a fluid medium and an outlet for discharge of filtered fluid medium, at least one pair of oppositely wound rolls of filter material in the chamber, the interiors of said rolls being connected to said outlet, and means for connecting the outside turn of each wound roll to a rotatable take-up spool in such a manner that the outer surfaces of each pair of oppositely wound rolls are in predetermined proximity to each other, when traveling across the reach between said rolls and the take-up spool, whereby rotation of said take-up spool will cause rotation of said oppositely wound rolls to wind the outside turns of each of said rolls on said take-up spool in such a manner that filter cake accumulated on the outer surface of each roll in each pair of oppositely wound rolls will contact in traveling across the reach between said wound rolls and the take-up spool thereby to confine the facing filter cakes between said traveling outside turns and to minimize loss of filter cake from said traveling turns.

7. Apparatus adapted to filter fluid medium comprising, a pressurizable chamber having an inlet for supply of a fluid medium and an outlet for discharge of filtered fluid medium, at least two pairs of adjacent and oppositely wound rolls in the chamber, said rolls each including permeable sheet filtration material wound upon itself, and selectively operative means responsive to pressure drop across said rolls for simultaneously removing successive layers of filter material from each pair of said oppositely wound rolls at a predetermined rate to maintain said pressure drop within predetermined limits, said selectively operative means including a take-up spool and a device for connecting the outside turn of the sheet material of each roll to the take-up spool, whereby rotation of said take-up spool will cause rotation of said filter rolls to wind the outside turns of each of said rolls on said take-up spool in such a manner that filter cake accumulated on each roll in each pair of oppositely wound rolls will contact, in traveling across the reach between the filter rolls and the take-up spool, and thereby confine the facing filter cakes therebetween to minimize loss of the filter cakes from said turns.

8. Apparatus adapted to filter fluid medium comprising a pressurizable chamber having an inlet for supply of the fluid medium and an outlet for discharge of filtered fluid medium, at least one pair of oppositely wound rolls of filter material in the chamber, means for connecting the outside turn of each of said rolls to a rotatable take-up spool, spaced from said rolls, in such a manner that the outer surfaces of the turns of preselected oppositely wound rolls traveling across the reach between said filter rolls and the take-up spool will be in predetermined proximity to each other at least adjacent the spool whereby rotation of said take-up spool will cause rotation of said filter rolls to wind the outside turns of each of said rolls on said take-up spool in such a manner that filter cake accumulated on the outer surfaces of said preselected oppositely wound rolls will contact in traveling across the reach between the filter rolls and the take-up spool and thereby confine the facing filter cakes on said outer surfaces between said traveling outside turns to minimize loss of filter cake from said rolls, and a plurality of circumferentially spaced inlets formed in the wall of the chamber for supply of the fluid medium to the chamber, each of said inlets being positioned for supply of the fluid medium at a location adjacent the spacing between a pair of adjacent rolls and away from the sides of said filter rolls from which the filter material is unwound to prevent current forces of the entering fluid from acting directly on the turns of filter material spanning the reaches between the rolls and the take-up spool.

9. Apparatus adapted to filter fluid medium comprising a pressurizable chamber having an inlet for supply of the fluid medium and an outlet for discharge of filtered fluid medium, at least one pair of oppositely wound rolls of filter material in the chamber, means for connecting the outside turn of each roll to a rotatable take-up spool, spaced from said rolls, in such a manner that the outer surfaces of the turns of filter material will be in predetermined proximity to each other, in traversing the reaches between the filter rolls and the take-up spool, at least adjacent the spool, whereby rotaion of said take-up spool will cause rotation of said filter rolls to wind the outside turns of each of said rolls on said take-up spool in such a manner that the facing filter cakes accumulated on said outer surfaces of adjacent oppositely wound rolls will contact in traversing the reaches between the filter rolls and the take-up spool and thereby confine the facing filter cakes between said traversing outside turns to minimize loss of the filter cakes from said rolls, a plurality of inlets for supply of the fluid medium to the chamber, each of said inlets being positioned for supply of the fluid medium at a location adjacent the spacing between a preselected pair of adjacent rolls and away from the sides of the preselected pair of filter rolls from which the outside turns of said material are unwound, and baffle means adjacent each of said inlets for directing the flow of fluid medium into the chamber from the corresponding inlets to distribute the fluid and to prevent direct action of current forces of the incoming fluid medium on either of said preselected pair of said filter rolls and on the turns of filter material spanning the reaches between the filter rolls and the take-up spool.

10. Apparatus adapted to filter fluid medium comprising, a vertically extending pressurizable chamber having an inlet for supply of the fluid medium and an outlet for discharge of filtered fluid medium, at least one pair of oppositely wound and vertically extending rolls of filter material in the chamber, the interiors of the rolls being connected to said outlet, vertically extending means for connecting the outside turn of each roll to a rotatable and vertically extending take-up spool in such a manner that the outer surfaces of said turns are in predetermined proximity in traveling across the reach between the filter rolls and the take-up spool, whereby rotation of said take-up spool will cause rotation of said filter rolls to wind the outside turns of each of said rolls on said take-up spool in such a manner that filter cake accumulated on the outer surface of one roll will contact the filter cake on an adjacent oppositely wound roll in traveling across the reach between the filter rolls and the take-up spool to confine the facing filter cakes between said traveling outside turns to minimize loss of filter cake from said turns, a plurality of inlets for supply of the fluid medium to the chamber, each of said inlets being positioned for supply of the fluid medium at a location adjacent the spacing between a preselected pair of adjacent rolls and away from the sides of said pair of filter rolls from which the filter material is unwound to distribute the fluid entering the chamber so that current forces of the entering fluid do not act directly on the turns of filter material spanning the reaches between the rolls and the take-up spool.

(References on following page)

References Cited by the Examiner

UNITED STATES PATENTS

| | | | |
|---|---|---|---|
| 420,136 | 1/1890 | Willis | 210—323 |
| 1,821,082 | 9/1931 | Tyler | 210—387 |
| 2,032,140 | 2/1936 | Mallory et al. | 210—232 X |
| 2,055,872 | 9/1936 | Manning | 210—107 |
| 2,055,874 | 9/1936 | Manning | 210—107 |
| 2,055,927 | 9/1936 | Goodwin | 210—107 |
| 2,143,229 | 1/1939 | Russel | 210—137 |
| 2,152,900 | 4/1939 | Manning | 210—387 |
| 2,250,672 | 7/1941 | Keefer | 210—387 X |
| 2,300,381 | 10/1942 | Hardy | 210—497 |
| 2,322,415 | 6/1943 | Buckbee | 210—330 |
| 2,359,386 | 10/1944 | Reinsch | 210—306 |
| 2,562,699 | 7/1951 | Cooperson et al. | 210—416 X |
| 2,651,416 | 9/1953 | Van Der Mark et al. | 210—330 |
| 2,667,273 | 1/1954 | Gardes | 210—456 X |
| 2,707,051 | 4/1955 | Mailhot et al. | 210—137 |
| 2,738,879 | 3/1956 | Frantz | 210—339 |
| 2,748,950 | 6/1956 | Tursky | 210—456 X |
| 2,819,800 | 1/1958 | Goodloe | 210—497 |
| 2,867,324 | 1/1959 | Hirs | 210—97 |

FOREIGN PATENTS

| | | |
|---|---|---|
| 16,779 | 7/1910 | Great Britain. |

REUBEN FRIEDMAN, *Primary Examiner.*

CARL F. KRAFT, HERMAN BERMAN, HERBERT L. MARTIN, CHARLES SUKALO, *Examiners.*